US012773858B2

(12) United States Patent
Kawakita et al.

(10) Patent No.: US 12,773,858 B2
(45) Date of Patent: Oct. 27, 2026

(54) INKJET RECORDING APPARATUS INCLUDING A DRYING DEVICE WITH A DUCT

(71) Applicant: CANON KABUSHIKI KAISHA, Tokyo (JP)

(72) Inventors: Jun Kawakita, Chiba (JP); Yoshiaki Hara, Chiba (JP); Kohei Aoki, Chiba (JP); Hiroshi Kokubo, Tokyo (JP); Yushi Sadamitsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 18/666,759

(22) Filed: May 16, 2024

(65) Prior Publication Data

US 2024/0408898 A1 Dec. 12, 2024

(30) Foreign Application Priority Data

Jun. 6, 2023 (JP) ................................ 2023-093117
Mar. 22, 2024 (JP) ................................ 2024-046614

(51) Int. Cl.

| | |
|---|---|
| ***B41J 11/00*** | (2006.01) |
| ***B41J 13/08*** | (2006.01) |
| ***B41J 29/13*** | (2006.01) |
| ***B65H 5/22*** | (2006.01) |

(52) U.S. Cl.

CPC ........ *B41J 11/0022* (2021.01); *B41J 11/0024* (2021.01); *B41J 11/0085* (2013.01); *B41J 13/08* (2013.01); *B41J 29/13* (2013.01); *B65H 5/224* (2013.01); *B65H 2301/5143* (2013.01); *B65H 2404/251* (2013.01)

(58) Field of Classification Search

CPC . B41J 11/0022; B41J 11/0024; B41J 11/0085; B41J 13/08; B41J 29/13; B41J 11/007; B65H 5/224; B65H 2301/5143; B65H 2404/251

See application file for complete search history.

(56) References Cited

U.S. PATENT DOCUMENTS

2006/0001721 A1* 1/2006 Yraceburu ............. B41J 13/223 347/102
2011/0037819 A1* 2/2011 Mizutani .............. B41J 11/0022 347/108
2021/0107275 A1* 4/2021 Peeters ................ B41J 11/0085

(Continued)

FOREIGN PATENT DOCUMENTS

JP 2014-040053 3/2014

*Primary Examiner* — Bradley W Thies
(74) *Attorney, Agent, or Firm* — Venable LLP

(57) ABSTRACT

An inkjet recording apparatus includes a drying device for drying a sheet by blowing air. The drying device includes a first duct with a suction opening for sucking air outside, a second duct with a blowing hole through which the air sucked from the suction opening is blown toward the sheet, a heater for heating air inside of the second duct; and a first fan for sending the air from the suction opening to the blowing hole. The suction opening is provided on a front side of the inkjet recording apparatus with respect to the second duct. The first duct forms a first flow passage of air flowing on the front side with respect to the second duct, and a second flow passage of air flowing downstream of the first flow passage in a flowing direction from the suction opening to the blowing hole and above the second duct.

15 Claims, 6 Drawing Sheets

(56) References Cited

U.S. PATENT DOCUMENTS

| | | | | |
|---|---|---|---|---|
| 2021/0370692 | A1* | 12/2021 | Sawase | B41J 11/00242 |
| 2022/0080749 | A1* | 3/2022 | Kawamichi | B41J 11/0021 |
| 2022/0263269 | A1 | 8/2022 | Hara | H01R 13/629 |

* cited by examiner (a)

(b)

INKJET RECORDING APPARATUS INCLUDING A DRYING DEVICE WITH A DUCT

FIELD OF THE INVENTION AND RELATED ART

The present invention relates to an inkjet recording apparatus for forming an image on a sheet by ink.

In an image forming system for forming an image by ink, there is a process of drying a sheet and a process of blowing air onto the sheet. For example, in Japanese Laid-Open Patent Application (JP-A) 2014-40053, a drying device, in which a sheet is conveyed by a belt and which dries the sheet by blowing warm air onto the sheet, is proposed.

SUMMARY OF THE INVENTION

According to an aspect of the present invention, there is provided an inkjet recording apparatus comprising: an image forming portion configured to form an ink image on a sheet; a sheet conveyance portion configured to convey the sheet on which the ink image is carried, and a drying device configured to dry the sheet by blowing air on the sheet conveyed to the sheet conveyance portion, wherein the drying device includes a suction opening configured to suck air outside of the inkjet recording apparatus; a first duct including the suction opening; a blowing hole through which the air sucked from the suction opening is blown toward the sheet conveyed by the sheet conveyance portion; a second duct including the blowing hole; a heating means configured to heat air inside of the second duct; and a first fan configured to send the air from the suction opening to the blowing hole, wherein the suction opening is provided on a front side of the inkjet recording apparatus with respect to the second duct, and wherein the first duct forms a first flow passage which is a flow passage of air flowing on the front side of the inkjet recording apparatus with respect to the second duct, and a second flow passage which is a flow passage of air flowing downstream of the first flow passage in a flow passage direction of the air from the suction opening to the blowing hole and above with respect to the second duct in a vertical direction.

Further features of the present invention will become apparent from the following description of exemplary embodiments with reference to the attached drawings.

DESCRIPTION OF THE EMBODIMENTS

First Embodiment

A first embodiment will be described by using from FIG. 1 through FIG. 4. First of all, a schematic configuration of an inkjet recording apparatus 100 according to the embodiment will be described by using FIG. 1.

Inkjet Recording Apparatus

The inkjet recording apparatus 100 as an image forming apparatus according to the embodiment applies an inkjet recording method which forms an image on a sheet by ejecting ink, and is a so-called sheet-fed type inkjet recording apparatus which forms an ink image on a sheet by using two liquids which are reaction liquid and ink. The sheet may be any recording material as far as ink is acceptable, for example, paper such as plain paper and cardboard, plastic film such as an overhead projector sheet, a specially shaped sheet such as an envelope and an index sheet, cloth, etc.

Figure 1:
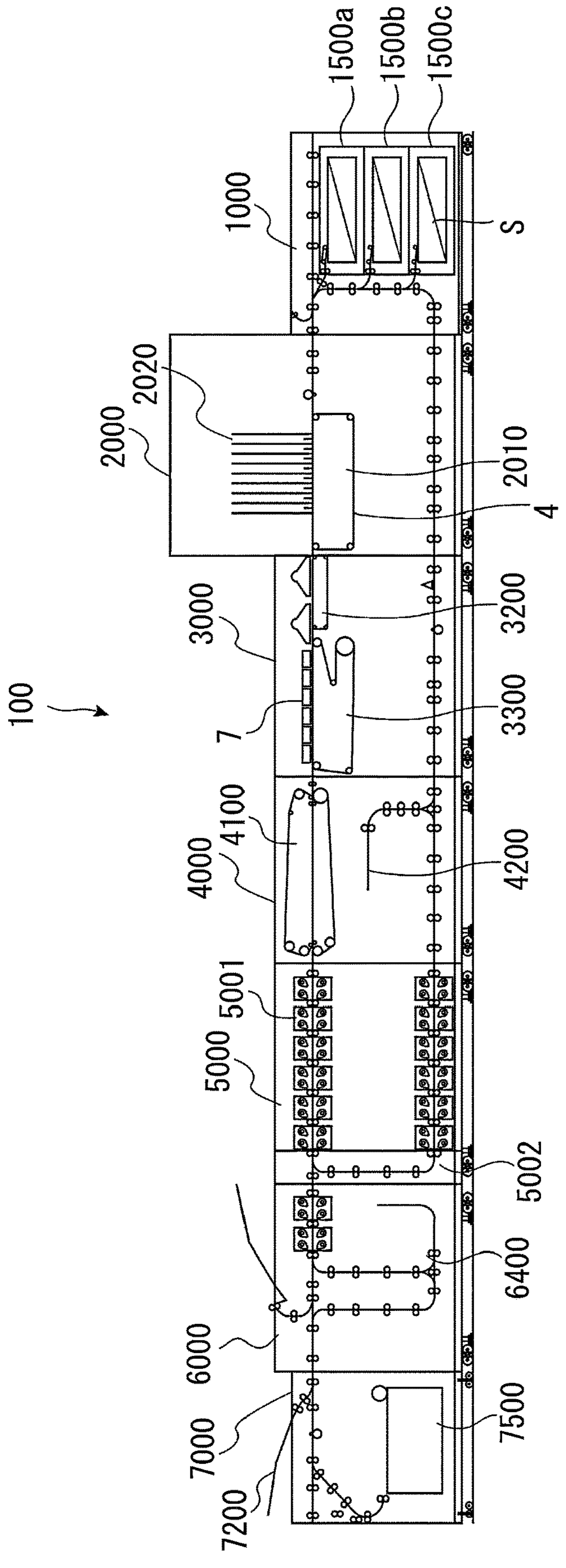
FIG. 1 is a sectional view of a schematic configure showing an inkjet recording apparatus according to a first embodiment.

As shown in FIG. 1, the inkjet recording apparatus 100 according to the embodiment is provided with a feeding module 1000, a printing module 2000 and a drying module 3000. Furthermore, the inkjet recording apparatus 100 is provided with a fixing module 4000, a cooling module 5000, a reversing module 6000, and a stacking module 7000. A sheet S which is supplied from the feeding module 1000 is processed in various steps while it is conveyed through each module along a conveying passage, and is finally discharged to the stacking module 7000.

Incidentally, each of the modules from the feeding module 1000 through the stacking module 7000 may include a casing separately, and the inkjet recording apparatus 100 may be configured by connecting these casings. Alternatively, the feeding module 1000, the printing module 2000, the drying module 3000, the fixing module 4000, the cooling module 5000, the reversing module 6000, and the stacking module 7000 may be disposed in one casing.

The feeding module 1000 includes accommodating containers 1500*a*, 1500*b*, and 1500*c* which accommodate the sheet S, the accommodating containers from 1500*a* through 1500*c* are provided so that it is possible to be pulled out toward a front surface side of the apparatus. The sheet S is fed one sheet by one sheet by a separating belt and a conveying roller in each of the accommodating containers from 1500*a* through 1500*c*, and conveyed to the printing module 2000. Incidentally, the accommodating containers from 1500*a* through 1500*c* are not limited to be three, however, it may include one, two or four or more.

The printing module 2000 is one of examples of an image forming portion and forms an ink image on a sheet. The printing module 2000 includes a pre image forming registration correction portion (not shown), a print belt unit 2010 and a recording portion 2020. The sheet S which is conveyed from the feeding module 1000 is conveyed to the print belt unit 2010 after its inclination and position are corrected by the pre image forming registration correction portion. With respect to the conveying passage, the recording portion 2020 is disposed at a position opposing the print belt unit 2010. The recording portion 2020 is an inkjet recording portion which forms an image by ejecting ink onto the sheet S with a recording head from above onto the sheet S which is being conveyed. A plurality of recording heads which eject ink are arranged in a line along the conveying direction. In the embodiment, a total of five line type recording heads, which corresponds to the reaction liquid in addition to four colors Y (yellow), M (magenta), C (cyan) and Bk (black), are included. Since the sheet S is attracted and conveyed by the print belt unit 2010, clearance with the recording head is ensured.

Incidentally, the number of colors of ink and the number of recording heads are not limited to five which are described above. For an inkjet system, a system which uses a heat generating element, a system which uses a piezoelectric element, a system which uses an electrostatic element, and a system which uses a MEMS (Micro Electro Mechanical Systems) element, etc. may be applied. Ink of each color is supplied from an ink tank (not shown) to the recording head through an ink tube, respectively. The ink includes “from 0.1 mass % to 20.0 mass %” based on a total ink mass of resin component, water and water soluble organic solvent, color material, wax, additives, etc.

The sheet S on which an image is formed by the recording portion 2020 is detected by an inline scanner (not shown) which is disposed on a downstream side of the recording portion 2020 with respect to the conveying direction of the sheet S, when the sheet S is conveyed by the print belt unit 2010. At this time, misalignment and color density of the image which is formed on the sheet S are detected, and the image which is formed on the sheet S, the density, etc. are corrected, based on the misalignment and the color density of the image.

Figure 2:
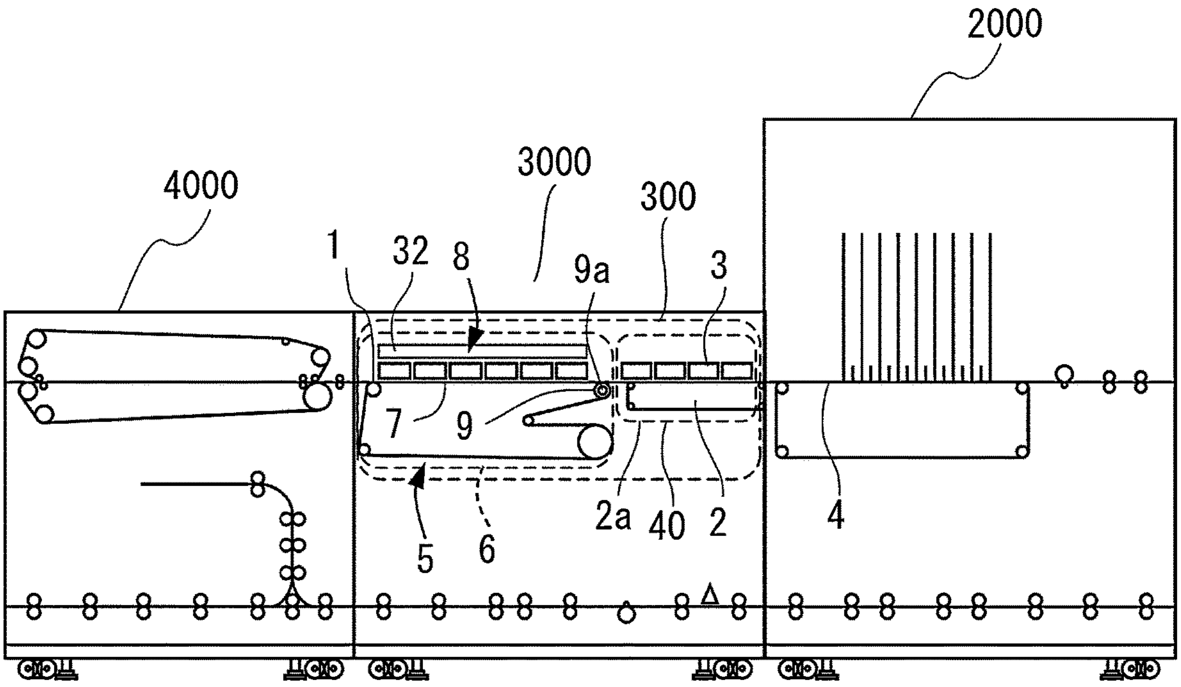
FIG. 2 is a sectional view of a schematic configure showing a drying module, a printing module and a fixing module according to the first embodiment.

The drying module 3000 is one of examples of a drying device, which dries the sheet S by blowing air against the sheet S fed to the drying belt unit 5. As shown in FIG. 2, the drying module 3000 includes a decoupling portion 40, a drying belt unit 5 and a warm air blowing unit 8. The drying module 3000 reduces liquid content of the ink and the reaction fluid which are applied to the sheet S in order to improve fixation property of the ink on the sheet S by the subsequent fixing module 4000. The sheet S on which the image is formed is conveyed to the decoupling portion 40 which is disposed in the drying module 3000. In the decoupling portion 40, frictional force is generated between the sheet S and a belt by wind pressure which is blown from above and the sheet S is conveyed by the belt. In this way, since the sheet S which is placed on the belt is conveyed by the frictional force, misalignment of the sheet S when it is conveyed across the print belt unit 2010 and the decoupling portion 40 is prevented. The sheet S which is conveyed from the decoupling portion 40 is attracted and conveyed by the drying belt unit 3300, and the ink and the reaction liquid which are applied to the sheet S are dried when warm air is blown from the warm air blowing unit 8 which is disposed above the belt.

In this way, since the ink and the reaction liquid which are applied to the sheet S is heated by the drying module 3000 and evaporation of the moisture is promoted, it is possible to suppress generating so-called cockling which forms lines around the ink like fringe when the ink splashes onto the sheet S. Incidentally, as for a heater which heats air, for example, an electric heating wire or an infrared heater, is preferable in terms of safety and energy efficiency. Further, in addition to a method of providing hot air, a drying method may be configured by combining irradiating electromagnetic waves (ultraviolet rays, infrared rays, etc.) to the surface of the sheet S, or a conductive heat transfer method by contacting a heating member.

As shown in FIG. 1, the fixing module 4000 as a fixing system includes a fixing belt unit 4100 as a fixing device. The fixing belt unit 4100 fixes the ink on the sheet S by passing the sheet S, which has been conveyed from the drying module 3000, between an upper belt unit and a lower belt unit which are heated. The fixing belt unit 4100 will be described in detail below.

The cooling module 5000 includes a plurality of cooling portions 5001, and the sheet S at high temperature which is conveyed from the fixing module 4000 is cooled by the cooling portions 5001. The cooling portions 5001 cool the sheet S, for example, by increasing pressure in the cooling box when taking outside air into a cooling box with a fan and applying air which is blown from the cooling box through nozzles due to the pressure to the sheet S. The cooling portions 5001 are disposed on both sides of the conveying passage of the sheet S and cool both sides of the sheet S.

The cooling module 5000 is provided with a conveying passage switching portion 5002. The conveying passage switching portion 5002 switches conveying passages of the sheet S according to a case that the sheet S is conveyed to the reversing module 6000 or a case that the sheet S is conveyed to a duplex (double-side) conveying passage for duplex printing in which image forming is performed on both sides of the sheet S.

The reversing module 6000 includes a reversing portion 6400. The reversing portion 6400 reverses front and back of the sheet S which is being conveyed and changes a front and back direction of the sheet S when it is discharged to the stacking module 7000. The stacking module 7000 includes a top tray 7200 and a stacking portion 7500, and stacks the sheets S which is conveyed from the reversing module 6000.

During duplex printing, the sheet S is conveyed to the conveying passage below the cooling module 5000 by the conveying passage switching portion 5002. After that the sheet S is returned to the printing module 2000 through the duplex conveying passage of the fixing module 4000, the drying module 3000, the printing module 2000 and the feeding module 1000. A duplex conveying portion of the fixing module 4000 is provided with a reversing portion 4200 which reverses front and back of the sheet S. After the sheet S has been returned to the printing module 2000, an image is formed on the other surface of the sheet S on which the image is not formed, and the sheet S is discharged to the stacking module 7000 via from the drying module 3000 to the reversing module 6000.

Drying Module

Next, the drying module 3000 will be described in detail by using FIG. 2 and FIG. 3. The drying module 3000 includes the decoupling portion 40, the drying belt unit 5 and the warm air blowing unit 8. These are collectively referred to as a drying function portion 300. The drying function portion 300 is disposed in an upper part of the drying module 3000 and includes a straight sheet conveying passage 1 to receive the sheet S which is discharged from the printing module 2000, dry the sheet S and then deliver the sheet S to the fixing module 4000. With respect to a sheet conveying direction in the sheet conveying passage 1, functions are different between an upstream portion and a downstream portion of the drying function portion 300.

In the upstream portion of the drying function portion 300, the decoupling portion 40 as an air blowing device is disposed. The decoupling portion 40 includes a decoupling belt unit 2 as a sheet conveyance portion and a cold air blowing unit 3 as an air blowing portion. The cold air blowing unit 3 is disposed above the decoupling belt unit 2 with respect to a vertical direction, and the decoupling belt unit 2 conveys the sheet S in a substantially horizontal direction. The decoupling belt unit 2 includes an endless belt 2*a* which is rotatable. And the sheet S is conveyed while the sheet S is pressed toward the belt 2*a* by blowing cold air (air) from an upper side of the decoupling belt unit 2 by the cold air blowing unit 3. The decoupling belt unit 2 is provided with a plurality of holes for passing air which is blown from the cold air blowing unit 3 from a blowing surface to a belt opposing side. Incidentally, air which has not been heated by a heater, etc. is also referred to as "cold air" in the following.

When a leading end of the sheet S reaches the decoupling belt unit 2 of the drying module 3000, a trailing end of the sheet S is still on the print belt unit 2010 of the printing module 2000. The print belt unit 2010 includes an endless print belt 4 (FIG. 1) which sucks and conveys the sheet S. On the print belt 4, image forming is performed on the sheet S, and the sheet S is sucked and conveyed on the print belt 4. To avoid any disturbance to the image forming process, force which presses the sheet S against the belt 2*a* is weaker than force which sucks the print belt 4, and the belt 2*a* is driven at a slightly faster speed than the print belt 4. That is, the sheet S always slides on the belt 2*a* while the trailing end of the sheet S is on the print belt 4.

On the other hand, as soon as the trailing end of the sheet S leaves a region of the print belt 4, conveyance of the sheet S becomes dependent on the belt 2*a*. At this time, it is necessary to control air blowing force of the cold air blowing unit 3 so that the sheet S does not slide against conveyance resistance. So, velocity of air which is blown from the cold air blowing unit 3 onto the sheet S which is conveyed on the belt 2*a* is controlled to a predetermined pressure by using a pressure sensor (not shown) which is provided inside the cold air blowing unit 3 and an intake fan (not shown) which is provided with an air intake portion. The cold air blowing unit 3 includes a blowing surface with which a number of blowing holes 5 for air to pass through are provided so that it is possible to apply uniform pressing force to the sheet S.

Main Body of the Drying Module

The decoupling portion 40, the drying belt unit 5 and the warm air blowing unit 8 are disposed inside a main body 301 of the drying module 3000. As shown in FIG. 3, the main body 301 includes an upper door 302 and a lower side casing 303. The warm air blowing unit 8 and the cold air blowing unit 3 are accommodated inside the upper door 302. Further, the drying belt unit 5 and the decoupling belt unit 2 are accommodated inside the lower side casing 303. The upper door 302 is configured to open upward to the lower side casing 303. The air blowing units 8 and the cold air blowing units 3 are disposed adjacent to each other along the sheet conveying direction.

Figure 3:
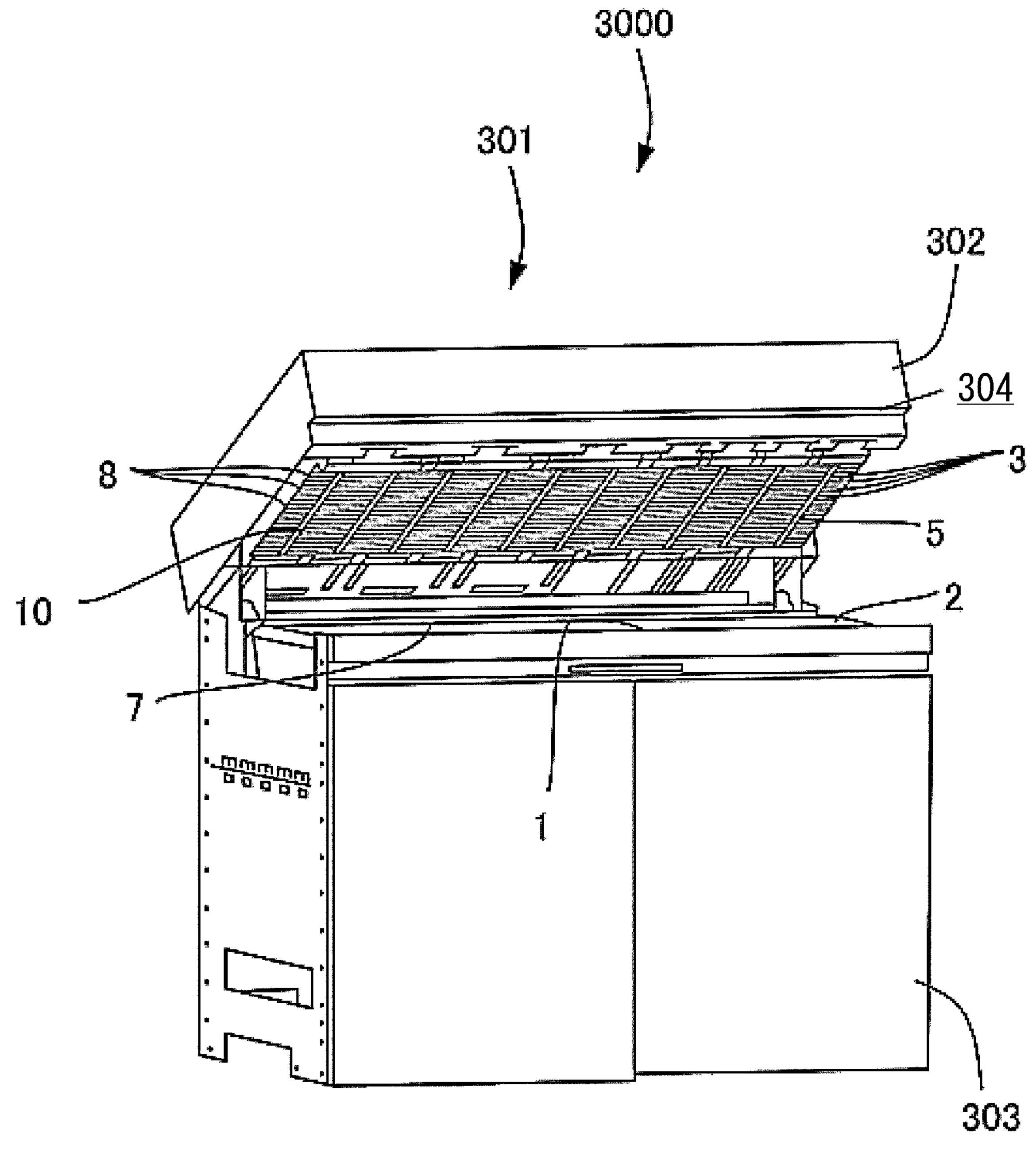
FIG. 3 is a perspective view showing a state an upper door is opened in the drying module according to the first embodiment.

As shown in FIG. 3, the upper door 302 is able to be opened upward in the vertical direction for a time of maintenance or a time of jam processing (clearance performance). Specifically, a rotation center, in which a right and left direction of the apparatus is set as a longitudinal direction, is provided on a back surface side of the apparatus, and a front surface of the upper door is rotated upward and lifted in the vertical direction. Therefore, an operator of the apparatus has a chance to touch a front surface side (a front surface exterior 33) and an upper surface (a top surface exterior 34) of the upper door 302.

Drying Portion

Next, a drying portion 6 will be described by using FIG. 2 and FIG. 4. In the downstream portion of the drying function portion 300, the drying portion 6 is disposed. The drying portion 6 includes the drying belt unit 5 and the warm air blowing unit 7. The warm air blowing unit 8 is disposed above the drying belt unit 5 with respect to the vertical direction, and the drying belt unit 5 is one of examples of the sheet conveyance portion and conveys the sheet S which bears an ink image in the substantially horizontal direction.

Figure 4:
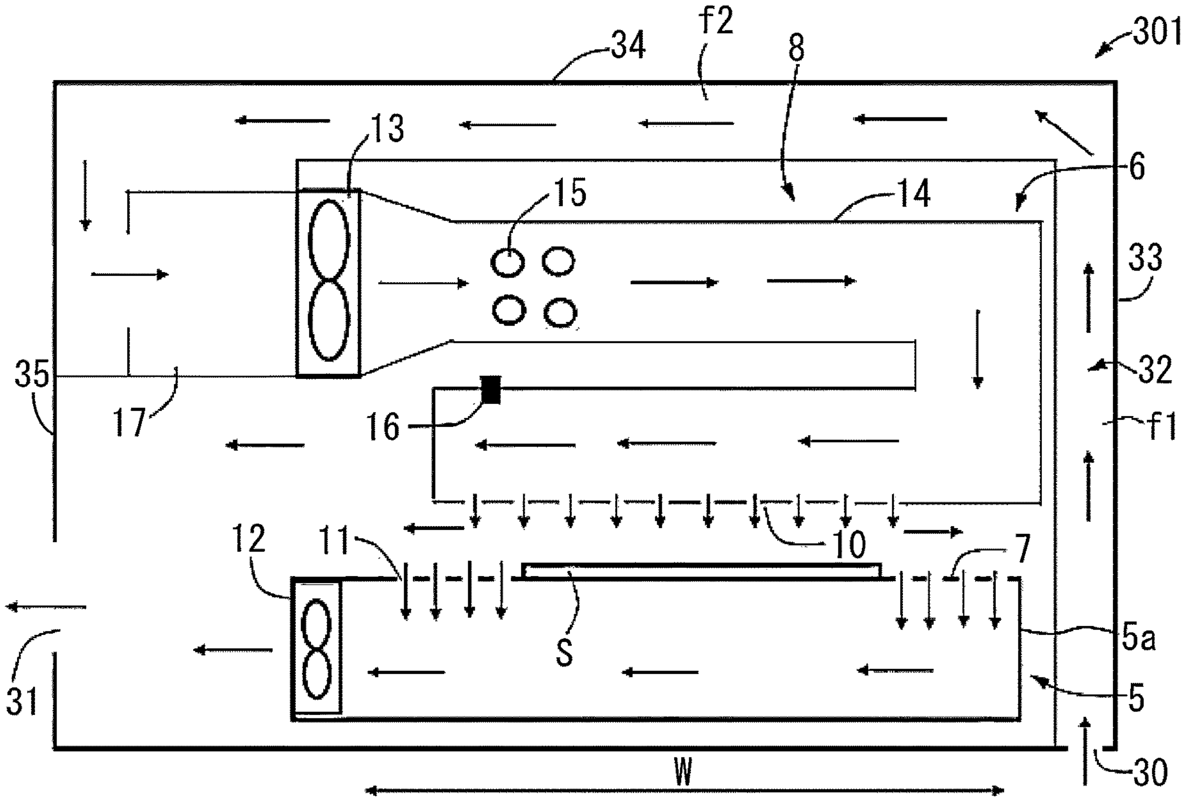
FIG. 4 is a sectional view of a schematic configure showing a drying portion of a warm air blowing unit according to the first embodiment.

As shown in FIG. 4, the drying portion 6 is surrounded by the front surface exterior 33, the top surface exterior 34 and a back surface exterior 35. Here, the front surface refers to a front surface of the main assembly of the inkjet recording apparatus 100, and indicates a side on which an operator performs an operation. On the other hand, the back surface refers to a back surface with respect to the front surface and indicates a side on which a board, a wiring, etc. of the apparatus are disposed. The upper door 302 is one of examples of casings, and the front surface exterior 33, the top surface exterior 34 and the back surface exterior 35 are one of examples of side walls which configure the upper door 302. The front surface exterior 33 is provided with a suction opening 30 for sucking outside air. That is, the suction opening 30 is provided with the front surface exterior 33 which is a part of the upper door 302 and sucks air from outside of the upper door 302 to inside of the upper door 302. In this way, the suction opening 30 sucks air outside of the inkjet recording apparatus 100. The back surface exterior 35 is provided with a discharging opening 31 for discharging air inside the drying portion 6 to the outside of the apparatus. That is, the discharging opening 31 is provided with the upper door 302 and discharges air from the inside of the upper door 302 to the outside of the upper door 302. A cooling duct 32 is formed in a part of space between the drying portion 6 and the front surface exterior 33, the top surface exterior 34 and the back surface exterior 35. The cooling duct 32 is communicated with a suction duct 17 of the warm air blowing unit 8 which will be described below. The cooling duct 32 is one of examples of a first duct, includes the suction opening 30 and blows air which is sucked from the suction opening 30.

Figure 5:
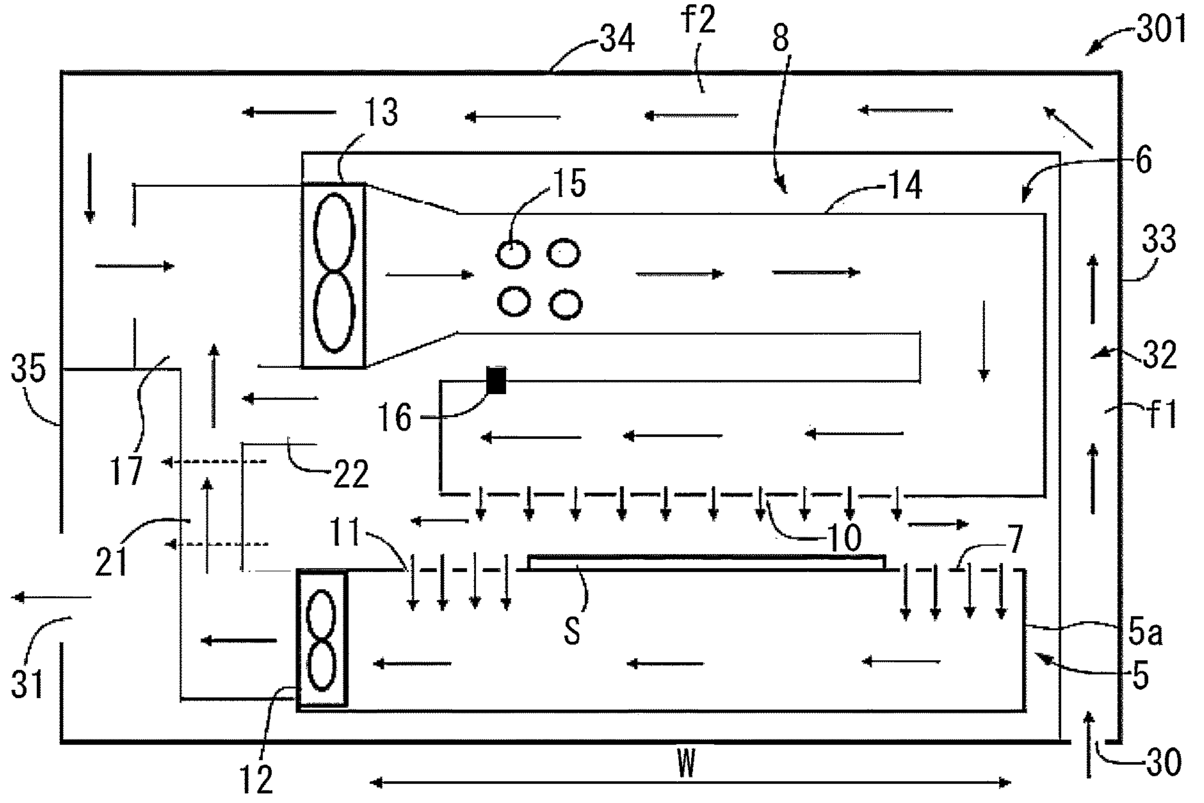
FIG. 5 is a sectional view of a schematic configure showing a drying portion of a warm air blowing unit according to a second embodiment.

Incidentally, the suction opening 30 opens downward with respect to a vertical direction, as shown in FIG. 4 and FIG. 5. Although arranging the suction opening opens toward the front surface of the main assembly of the inkjet recording apparatus 100 is also a possible form, it is preferable that the suction opening opens downward in the vertical direction since a user does not feel air flow much when the air is sucked.

In the embodiment, the cooling duct 32 is provided by only one for the plurality of warm air blowing units 8, and, for example, a sectional shape of an upper portion of the duct portion is a longitudinal shape along the sheet conveying direction (see FIG. 2). The suction ducts 17 of the plurality of warm air blowing units 8 are connected side by side in the sheet conveying direction, from the single cooling duct 32.

Warm Air Blowing Unit

Next, the warm air blowing unit 8 will be described by using FIG. 4. Arrows which are shown in FIG. 4 indicate air flow. The warm air blowing unit 8 includes an air blowing fan 13, an air blowing duct 14, a heater 15, a temperature sensor 16, the suction duct 17, etc. In the embodiment, the air blowing fan 13 is an axial flow fan. However, it is not limited to an axial flow fan, but other air blowing sources such as a sirocco fan may be used. The heater is a sheathed heater. However, it is not limited to a sheathed heater, but other heat sources such as a kanthal heater may be used. The suction duct 17 is connected to the air blowing fan 13 on its suction side.

The air blowing duct 14 is provided with the heater 15 and the temperature sensor 16 inside, and the air blowing fan 13 on its discharging side is connected to the air blowing duct 14 on its end portion. That is, the air blowing fan 13 is provided on an upstream end portion of the air blowing duct 14 with respect to a flow passage direction of the air. The heater 15 is disposed on a downstream side of an air blowing passage of the air blowing fan 13. That is, the air blowing fan 13 is disposed upstream of the heater 15 with respect to the flow passage direction of the air. The heater 15 is one of examples of a heating means, is provided downstream from the air blowing fan 13 in the air blowing duct 14 and heats the air inside the air blowing duct 14.

A surface opposing the sheet S further downstream of the heater 15 is a warm air blowing surface, and a plurality of warm air blowing holes 10 are formed. The warm air blowing hole 10 is one of examples of a blowing hole and blows the air which is sucked from the suction opening 30 towards the sheet S which is conveyed by the drying belt unit 5. The air blowing duct 14 is one of examples of a second duct, includes the warm air blowing hole 10 and blows the air which is received from the cooling duct 32 to a blowing position which opposes the sheet S which is conveyed by the drying belt unit 5. The air blowing fan 13 is one of examples of a first fan and blows the air from the suction opening 30 to the warm air blowing hole 10 via the cooling duct 32, the suction duct 17 and the air blowing duct 14. The temperature sensor 16 is mounted on an upper surface opposing the warm air blowing hole 10 in the air blowing duct 14. Electric current which heats the heater 15 is controlled by a control portion (not shown), according to temperature which is detected by the temperature sensor 16.

The cooling duct 32 is disposed between the air blowing duct 14 and the front surface exterior 33, the top surface exterior 34 and the back surface exterior 35. In this way, it is possible to prevent the heat of the drying portion 6 from conducting to an exterior of the main body 301. Further, in the embodiment, the first duct is provided on inner surfaces of the front surface exterior 33, the top surface exterior 34 and the back surface exterior 35. That is, the front surface exterior 33 and the top surface exterior 34 configure a part of the cooling duct 32 as an exterior of the inkjet recording apparatus 100 which faces an outside air. Therefore, it is possible to prevent the heat of the drying portion 6 from conducting to an exterior of the main body 301 even more efficiently. Here, provided on the inner surfaces includes a case in which it is integrated with an exterior member, a case in which it is fixed to the exterior member by screwing, etc. and in the embodiment, it is mounted so that it is in close contact with the exterior member. Further, the exterior member and the cooling duct 32 are not limited to being in close contact, however, there may be a space between the exterior member and the cooling duct 32. Even when there is the space between the exterior member and the cooling duct 32, the high temperature air which is staying in a vicinity of the exterior member is cooled by the cooling duct 32.

The cooling duct 32 forms a first flow passage f1 and a second flow passage f2. The first flow passage f1 is an air flow passage on the front surface side of the inkjet recording apparatus 100 with respect to the air blowing duct 14. Further, the first flow passage f1 is configured of a cooling duct which is disposed in the upper door 302 and a cooling duct which is disposed in the lower door 303. Incidentally, in a case that the upper door 302 is opened upward in the vertical direction as shown in FIG. 3, the first flow passage f1 is separated into an upper door side and a lower door side. The second flow passage f2 is an air flow passage which flows downstream of the first flow passage f1 with respect to a direction of air flow from the suction opening 30 to the warm air blowing hole 10, and flows above the air blowing duct 14 in the vertical direction.

Further, in the embodiment, the suction opening 30 is provided on the front surface exterior 33, which is a side wall on one side of the main body 301 with respect to a width direction W, which intersects the sheet conveying direction and the vertical direction. The front surface side is a front surface side of the inkjet recording apparatus 100 and a side in which a control portion, etc. is disposed and a user is positioned during use and operation. And the cooling duct 32 is disposed between the air blowing duct 14 and the front surface exterior 33, between the air blowing duct 14 and the top surface exterior 34 which is a side wall of an upper side in the vertical direction, and between the air blowing duct 14 and an upper portion of the back surface exterior 35. That is, the suction opening 30 is provided on the front surface side of the inkjet recording apparatus 100 rather than the air blowing duct 14. In this way, it is possible to suppress temperature rise in an exterior on the front surface side and the upper surface side of the drying module 3000 in which a user is likely to contact. Incidentally, the cooling duct 32 may not necessarily be disposed between the air blowing duct 14 and the back surface exterior 35. Further, the discharging opening 31 is provided on the back surface exterior 35, which is a side wall on the other side wall of the main body 301 with respect to the width direction W. Therefore, it is possible to discharge high temperature air while it is away from the user.

Drying Belt Unit

Next, the drying belt unit 5 will be described by using FIG. 2 and FIG. 4. The drying belt unit 5 includes a drying belt 7 which is rotatable and endless, a plurality of stretching rollers 9 which stretch the drying belt 7, and a belt heater 9*a* as a belt heater which heats the drying belt 7, and conveys a sheet while heating the sheet with the drying belt 7. The belt heater 9*a* is a halogen heater which is disposed inside any stretching roller 9 of the plurality of stretching rollers 9 and heats the drying belt 7 via the stretching roller 9. In the embodiment, among pairs of stretching rollers 9 which stretch a surface opposing the warm air blowing unit 8, the belt heater 9*a* is disposed inside the stretching roller 9 on an upstream side with respect to the sheet conveying direction.

Furthermore, the drying belt unit 5 includes a suction box 5*a* which is disposed on an inner peripheral side of the drying belt 7 and a suction fan 12 which is connected to the suction box 5*a*. The drying belt 7 includes a plurality of suction holes 11 through which air is sucked by the suction fan 12. A suction opening is formed on a surface of the suction box 5*a* opposing the drying belt 7. And a configuration is such that the sheet S is attracted to the surface of the drying belt 7, when the suction fan 12 sucks air through the suction box 5*a* and air is sucked through the plurality of suction holes 11 of the drying belt 7. Such the drying belt unit 5 is capable of attracting the sheet S to the surface of the drying belt 7 and conveying the sheet S. That is, the suction fan 12 is one of examples of a second fan which sucks air, and the drying belt 7 conveys the sheet S while the sheet S is attracted onto the surface of the drying belt 7 as sucking air by the suction fan 12. In the embodiment, the air which is sucked from the suction fan 12 is discharged into an inside space of the main body 301.

In the drying portion 6, while the sheet S is attracted onto the drying belt 9 by sucking the sheet S with the drying belt unit 5, the sheet S is dried when warm air is blown from an upper side in the vertical direction by the warm air blowing unit 8, and the sheet S is conveyed while suppressing waving which is called cockling. In order to dry the sheet S rapidly, surface temperature of the drying belt 7 is adjusted to a predetermined temperature by controlling the belt heater 9*a* which is disposed inside the stretching roller 9 based on temperature which is detected by a temperature sensor (not shown) which is provided inside the drying belt unit 5. In this way, the sheet S which is conveyed by the drying belt 7 is heated.

On the other hand, a warm air temperature inside the warm air blowing unit 8 is controlled at a predetermined temperature by using the temperature sensor 16 and the heater 15 which are provided inside the unit. Further, velocity of air which is blown from the warm air blowing holes 10 of the warm air blowing unit 8 is controlled to a predetermined pressure by using a pressure sensor (not shown) which is provided inside the unit and the suction fan 12. The warm air blowing unit 8 dries the ink on the sheet S by such a configuration.

In order to fix the sheet S on the drying belt 7, a suction pressure on a top surface of the drying belt 7 is adjusted to a predetermined pressure by controlling the suction fan 12 based on pressure which is detected by a pressure sensor (not shown) which is provided inside the suction box 5*a*. In this way, the warm air blowing unit 8 presses the sheet S onto the drying belt 7 by blowing warm air. Incidentally, a distance from a suction end position of the print belt 4 to a suction start position of the drying belt 7 is set to be longer than a maximum sheet length.

Air Flow in Drying Portion

Next, an air flow in the drying portion 6 will be described by using FIG. 4. Arrows in FIG. 4 indicate air flow. When the air blowing fan 13 is driven, the air from outside of the drying module 3000 is sucked through the suction opening 30, passes through the cooling duct 32 from the front surface of the main body to the top surface and reaches the suction duct 17 from the back surface side of the main body.

The air which has reached the suction duct 17 is sucked into the air blowing fan 13 and reaches the heater 15 in the air blowing duct 14. The air which is heated by the heater 15 passes through the warm air blowing hole 10 and is blown to the sheet S. The air which has been blown to the sheet S passes through a space between the warm air blowing surface and the drying belt 7, passes in the sheet conveying direction, passes in the sheet width direction W, and furthermore passes from the suction hole 11 which is not covered with the sheet in the drying belt 7 to the suction fan 12, fills in the drying portion 6, and is discharged from the discharging opening 31 to outside of the apparatus.

In this way, since the air which is heated by the heater 15 and becomes high temperature is constantly filled inside the drying portion 6, drying of the sheet S is accelerated by the high temperature inside the drying portion 6 as becoming the high temperature. The air which is used for drying includes more moisture due to evaporation of the ink. Therefore, since the air inside the drying portion 6 is discharged, air from outside with low moisture content is sucked from the suction opening 30 and the air inside the drying portion 6 is replaced, it is prevented that humidity in the drying portion 6 rises and ink becomes hard to evaporate.

As described above, according to the drying module 3000 in the embodiment, the cooling duct 32 is disposed between the air blowing duct 14, and the front surface exterior 33, the top surface exterior 34 and the back surface exterior 35. Therefore, since it is possible to suppress the drying portion 6 to conduct the heat to the exterior of the main body 301, it is possible to suppress temperature rise of the exterior.

In the drying portion 6 according to the embodiment, the cooling duct 32 is formed among the front surface exterior 33, the top surface exterior 34 and a part of the back surface exterior 35. In the cooling duct 32, outside air which is sucked from the suction opening 30 in the front surface exterior 33 is flown. Therefore, the heat in the drying portion 6 which is at high temperature is transferred to the air which is flown through the cooling duct 32 and is not transferred directly to the exterior. Furthermore, since the air in the cooling duct 32 is constantly replaced by sucking air from outside, the temperature is less likely to rise. Thus, it is possible to suppress the temperature rise of the front surface exterior 33 and the top surface exterior 34 due to heat transfer from inside of the drying portion 6 without using expensive members such as insulation.

Incidentally, insulation is not used in the embodiment, however, in order to further improve cooling efficiency, insulation may be used. For example, it is possible to obtain further temperature rise prevention effect of the front surface exterior 33 and the top surface exterior 34 by providing insulation between the front surface exterior 33 and the top surface exterior 34, and the cooling duct 32.

Further, the air in the cooling duct 32, which is warmed by heat transfer from the drying portion 6, is passed through the warm air blowing unit 8 and is blown to the sheet S. Therefore, it is possible to reuse the heat, which is taken from the drying portion 6 to cool the front surface exterior 33 and the top surface exterior 34, for drying the sheet S. Thus, it is possible to reduce heating value of the heater 15 inside the warm air blowing unit 8 and reduce power consumption, compared to a case that the air which cooled the exterior is discharged directly to the outside of the apparatus.

In the embodiment, the printing module 2000 and the fixing module 4000 are connected to both side surfaces of the drying module 3000. Since a user can not touch side surface of the drying portion 6, it is not necessary to cool it. Further, in normal use, the back surface of the main body is also not a portion in which a user deliberately touch. Therefore, it is important to suppress the exterior of the front surface and the exterior of the top surface of the main body to heat up. In the embodiment, the cooling duct 32 is provided on the front surface side and the top surface side of the assembly rather than the air blowing duct 14. Thus, it is possible to suppress temperature increase of the exterior of the main body 301.

In the embodiment, the discharging opening 31 which discharge the air inside the drying portion 6 is provided on the back surface exterior 35. In this way, it is possible to suppress that a user touches the high temperature air which is discharged from the discharging opening 31. That is, the discharging opening 31 is disposed on the back surface side of the inkjet recording apparatus 100 and discharges the air which is blown from the warm air blowing hole 10 to the outside of the inkjet recording apparatus 100.

In the embodiment, the suction opening 30 for the air inside the drying portion 6 is provided on the front surface exterior 33 which opposes the discharging opening 31 which is provided on the back surface exterior 35. Here, in a case that the suction opening 30 and the discharging opening 31 are provided on the same surface, the high temperature air which is discharged from the discharging opening 31 may be sucked from the suction opening 30. In this case, the temperature of the front surface exterior 33 and the top surface exterior 34 may become high when the air which is sucked from the suction opening 30 becomes warm. Therefore, in the embodiment, the suction opening 30 in which the air is sucked is provided on the front surface exterior 33 which opposes the discharging opening 31 which is provided on the back surface exterior 35, and this prevents the temperature rise of the main body 301.

In the embodiment, the air blowing fan 13 is disposed inside the drying portion 6, however, it may be provided at the suction opening 30 or the discharging opening 31, or both of them. However, in a case that the air blowing fan 13 is provided at the discharging opening 31, lifetime of the air blowing fan 13 may be shortened since the air in which the air blowing fan 13 sucks becomes high temperature. For this reason, it is preferable to provide the air blowing fan 13 at the suction opening 30, in which the temperature of the air which is sucked is lower, than at the discharging opening 31.

Second Embodiment

Next, a second embodiment of the present invention will be described in detail with reference to FIG. 5. In the embodiment, a configuration differs from that of the first embodiment in that the air which is sucked from the suction fan 12 is not discharged into an internal space of the main body 301 but is recirculated. However, since other configurations are the same as in the first embodiment, the same reference numerals are used and detailed descriptions are omitted.

In the embodiment, as shown in FIG. 5, the drying portion 6 includes a first circulation duct 21 and a second circulation duct 22. The first circulation duct 21 combines a part of the air which is sucked from the suction fan 12 with the suction duct 17 which is upstream from the heater 15 in the air blowing duct 14, and circulates it. The first circulation duct 21 is one of examples of a third duct, is connected to the drying belt unit 5 and guides a part of the air which sucked through the suction hole 11 of the drying belt 7 by the suction fan 12 into the air blowing duct 14. The second circulation duct 22 combines the air in an internal space of the drying portion 6 with the suction duct 17 which is upstream from the heater 15 in the air blowing duct 14 and circulates it. The second circulation duct 22 is one of examples of a fourth duct and guides a part of the air which is blown by the warm air blowing hole 10 into the air blowing duct 14. In the embodiment, the first circulation duct 21 and the second circulation duct 22 are connected on an upstream side of the suction duct 17. The second circulation duct 22 is connected to the inside of the drying portion 6 and flows the warm air which is blown from the warm air blowing unit 8 to the sheet S into the suction duct 17.

Further, an air volume (air flow) of the air blowing fan 13 is greater than that of the suction fan 12. In this way, suction is performed from the second circulation duct 22. An amount of air corresponding to an air volume difference between the air volume of the air blowing fan 13 and the air volume of the suction fan 12 is sucked by the suction opening 30.

Next, an air flow in the drying portion 6 will be described by using FIG. 5. Arrows which are shown in FIG. 5 indicate air flow. When the air blowing fan 13 is driven, the air from outside is sucked through the suction opening 30, passes through the cooling duct 32 from the front surface of the main body to the top surface and reaches the suction duct 17 from the back surface side of the main body. The air which has reached the suction duct 17 is sucked into the air blowing fan 13 and reaches the heater 15 in the air blowing duct 14. The air which is heated by the heater 15 passes through the warm air blowing hole 10 and is blown to the sheet S.

The air which has been blown to the sheet S passes through a space between the warm air blowing surface and the drying belt 7, passes in the sheet conveying direction, passes in the sheet width direction W, and furthermore passes through the suction hole 11 which is not covered with the sheet S in the drying belt 7 and a part of the air is discharged from the inside of the drying portion 6 to outside of the apparatus through the discharging opening 31. The remaining air is sucked from the first circulation duct 21 and the second circulation duct 22 into the air blowing fan 13 through the suction duct 17 and circulates inside the drying portion 6 from the air blowing duct 14.

As described above, according to the drying module 3000 in the embodiment, the cooling duct 32 is disposed between the air blowing duct 14, and the front surface exterior 33, the top surface exterior 34 and the back surface exterior 35. Therefore, since it is possible to suppress the drying portion 6 to conduct the heat to the exterior of the main body 301, it is possible to suppress temperature rise of the exterior. In particular, according to the embodiment, since it is possible to circulate the air inside the drying portion 6, its thermal efficiency is increased and it is possible to reduce power consumption for drying the sheet S.

In each of the embodiments which are described above, a configuration of the inkjet recording apparatus for sheet paper printing as shown in FIG. 1 is described. However, the inkjet recording apparatus is not limited to a sheet paper printing machine, but it is also possible to apply to a continuous printing machine. In a case of a continuous printing machine, since a sheet is continuous from feeding to discharging, it is not necessary to continuously arrange conveying belts which convey a sheet as in a case of a sheet paper printing machine.

Third Embodiment

Figure 6:
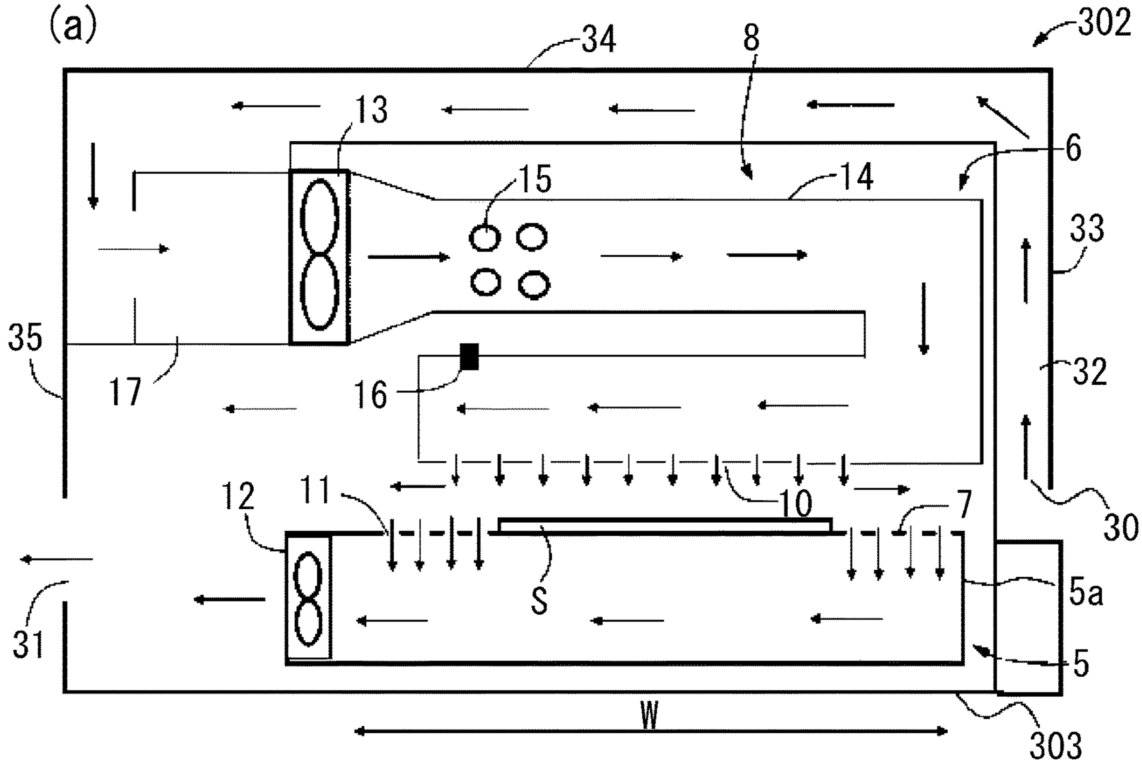
FIG. 6, part (a) and part (b), is a sectional view of a schematic configure showing a drying portion of a warm air blowing unit according to a third embodiment.
Figure 6:
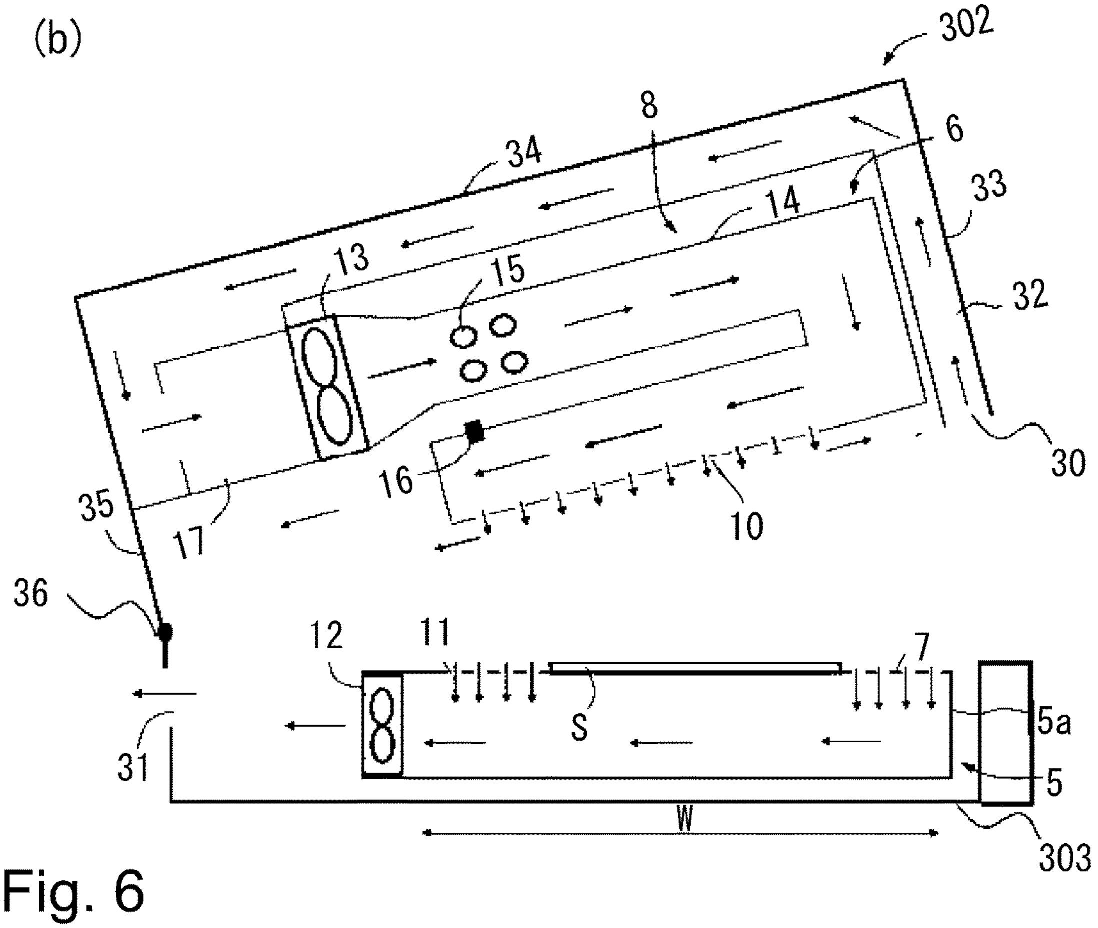

Next, a third embodiment of the present invention will be described in detail with reference to FIG. 6. In the embodiment, a configuration differs from that of the first embodiment and that of the second embodiment in that the suction opening 30 is mounted on a side of the upper door 302 and a cooling duct for cooling exterior parts without including a complex duct structure is provided. However, since other configurations are the same as in the first embodiment, the same reference numerals are used and detailed descriptions are omitted.

As shown in FIG. 3, the main body 301 includes the upper door 302 and the lower side casing 303. The warm air blowing unit 8 and the cold air blowing unit 3 are accommodated inside the upper door 302. Further, the drying belt unit 5 and the decoupling belt unit 2 are accommodated inside the lower side casing 303. The upper door 302 is configured to open upward to the lower side casing 303. Since the upper door 302 is opened upward in the vertical direction, it is possible to expose the drying belt 7 of the lower side casing 303, and this is used for the time of maintenance or the time of jam processing. Specifically, a rotation center 36, in which the right and left direction of the apparatus is set as the longitudinal direction, is provided on the back surface side of the apparatus, and the front surface of the upper door is rotated upward and lifted in the vertical direction. Part (a) of FIG. 6 shows a state when the upper door 302 is closed, and part (b) of FIG. 6 shows a state when the upper door 302 is open.

In the embodiment, the suction opening 30 is provided on the front surface exterior 33, which is a side wall on one direction side surface of the upper door 302 with respect to the width direction W, which intersects the sheet conveying direction and the vertical direction. The front surface side is a front surface side of the inkjet recording apparatus 100 and a side in which a control portion, etc. is disposed and a user is positioned during use and operation. In this way, it is possible to suppress temperature rise with a simpler configuration, in an exterior on the front surface side and the upper surface side of the drying module 3000 in which a user is likely to contact, by providing the cooling duct 32 only for the upper door 302 in a configuration in which the upper door 302 and the lower door 303 are opened by rotation.

Further, it is possible to cool without causing problems such as air leaks which occur in a case that the first flow passage is separated to the upper door side and to the lower door side as in the first embodiment. Further, as mentioned above, it is possible to open the upper door 302 upward in the vertical direction, and a recess portion 304 in which a user put hand on when opening it upward is provided on the front surface side of the upper door 302. The recess portion 304 is provided parallel to the sheet conveying direction. The suction opening 30 is disposed in the recess portion 304. That is, the suction opening 30 opens downward in the vertical direction. An example, in which one recess portion is provided, is shown in FIG. 3, however, it is not limited to this. It may be configured so that a plurality of recess portions are provided for a portion in which the suction opening 30 is disposed. Disposing the suction opening facing toward the front surface of the main assembly of the inkjet recording apparatus 100 may be a possible form. It is possible to configure a simpler appearance than a case that the suction opening is provided on the front surface of the apparatus, and further it is preferable that the suction opening is facing downward in the vertical direction as a user is less likely to feel air flow when the suction opening is sucked. Further, in a case that it is configured so that the air which is sucked from the suction fan 12 is recirculated as in the second embodiment, it may be configured so that the suction opening 30 is provided in the recess portion 304 of the upper door 302.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2023-093117 filed on Jun. 6, 2023 and 2024-046614 filed on Mar. 22, 2024, which are hereby incorporated by reference herein in their entirety.

What is claimed is:

1. An inkjet recording apparatus comprising:
an image forming portion configured to form an ink image on a sheet;
a sheet conveyance portion configured to convey the sheet on which the ink image is carried, and
a drying device configured to dry the sheet by blowing air on the sheet conveyed to the sheet conveyance portion, the drying device including:
a suction opening configured to suck air outside of the inkjet recording apparatus;
a first duct configured to form a flow passage through which the air sucked from the suction opening flows;
a second duct connected to the first duct downstream of the first duct in a flow passage direction of the first duct and configured to form a flow passage through which the air flows;
a heating device provided inside the second duct and configured to heat air inside of the second duct;
a blowing hole provided in the second duct and through which the air heated by the heating device is blown toward the sheet conveyed by the sheet conveyance portion; and
a fan configured to send the air from the suction opening to the blowing hole,
wherein the suction opening is provided on a front side of the inkjet recording apparatus with respect to the second duct, and
wherein the first duct includes:
a first flow passage disposed on the front side of the inkjet recording apparatus with respect to the second duct, the first flow passage being disposed such that, in a cross section perpendicular to a conveyance direction of the sheet conveyance portion, the first duct and the second duct overlap with each other as viewed in a sheet widthwise direction, and
a second flow passage connected to the first flow passage downstream of the first flow passage in a flow passage direction of the first flow passage, the second flow passage being disposed above the second duct in a vertical direction and disposed such that in the cross section perpendicular to the conveyance direction of the sheet conveyance portion, the first duct and the second duct overlap with each other as viewed in the vertical direction.

2. An inkjet recording apparatus according to claim 1, wherein the suction opening is provided facing downward in the vertical direction.

3. An inkjet recording apparatus according to claim 1, further comprising a discharging opening through which the air blown from the blowing hole is discharged to outside of the inkjet recording apparatus,
wherein the discharging opening is disposed on a back side of the inkjet recording apparatus.

4. An inkjet recording apparatus according to claim 1, wherein the fan is disposed upstream of the heating device in the flow passage direction.

5. An inkjet recording apparatus according to claim 1, wherein the sheet conveyance portion includes a rotatable endless belt, a plurality of stretching rollers configured to stretch the belt and a belt heater configured to heat the belt, and heats and conveys the sheet by the belt.

6. An inkjet recording apparatus according to claim 5, wherein the sheet conveyance portion includes a suction fan configured to suck air,
wherein the belt absorbs the sheet on a surface of the belt by the air being sucked by the suction fan and conveys the sheet.

7. An inkjet recording apparatus according to claim 6, further comprising a third duct configured to guide a part of the air sucked from the suction fan to the second duct.

8. An inkjet recording apparatus according to claim 7, further comprising a fourth duct configured to guide a part of the air blown from the blowing hole to the second duct without passing through the third duct.

9. An inkjet recording apparatus according to claim 1, wherein the first duct includes an outer casing facing outside air of the inkjet recording apparatus.

10. An inkjet recording apparatus according to claim 1, further comprising a displacement portion including a rotational axis along a conveyance direction of the sheet and capable of being displaced between a closed position and an open position by rotation, and a lower door including at least the sheet conveyance portion and an upper door including at least the blowing hole in a case in which the displacement portion is the open position, wherein the suction opening is provided on the upper door.

11. An inkjet recording apparatus according to claim 1, wherein the first flow passage is extended in a vertical direction in a cross section perpendicular to the conveyance direction of the sheet conveyance portion, and is configured such that the air sucked from the suction opening flows from a lower side toward an upper side.

12. An inkjet recording apparatus according to claim 1, wherein the second flow passage is extended in the sheet widthwise direction perpendicular to the conveyance direction of the sheet conveyance portion in a cross section perpendicular to the conveyance direction, and is configured such that air sucked from the suction opening flows from the front side toward a rear side of the inkjet recording apparatus.

13. An inkjet recording apparatus according to claim 1, further comprising an operation portion disposed on the front side of the inkjet recording apparatus.

14. An inkjet recording apparatus according to claim 1, wherein in a cross section perpendicular to the conveyance direction of the sheet conveyance portion, the second duct includes a third flow passage extended in a sheet widthwise direction perpendicular to the conveyance direction of the sheet conveyance portion, and a fourth flow passage connected to the third flow passage downstream of the third flow passage in a flow passage direction of the third flow passage and disposed between the third flow passage and the sheet conveyance portion.

15. An inkjet recording apparatus according to claim 1, wherein the suction opening is disposed below the second duct in a vertical direction.

* * * * *